United States Patent [19]

Leon

[11] 4,346,064
[45] Aug. 24, 1982

[54] DECONTAMINATION OF COMBUSTION GASES IN FLUIDIZED BED INCINERATORS

[75] Inventor: Albert M. Leon, Mamaroneck, N.Y.

[73] Assignee: Dorr-Oliver Incorporated, Stamford, Conn.

[21] Appl. No.: 215,579

[22] Filed: Dec. 12, 1980

[51] Int. Cl.$^3$ .......................... B01J 8/00; C01B 17/00
[52] U.S. Cl. ...................................... 423/244; 110/345
[58] Field of Search .......... 423/242 A, 242 R, 244 A, 423/244 R, 232; 110/343, 345

[56] References Cited

U.S. PATENT DOCUMENTS 3,625,164 12/1971 Spector ........................... 423/244 A
3,707,462 12/1972 Moss .................................... 423/242
3,969,089 7/1976 Moss et al. ...................... 423/244 A Primary Examiner—O. R. Vertiz
Assistant Examiner—Gregory A. Heller Attorney, Agent, or Firm—Stephen A. Roen

[57] ABSTRACT

Sulfur-containing atmospheric pollutants are effectively removed from exit gas streams produced in a fluidized bed combustion system by providing a fluidized bed of particulate material, i.e. limestone and/or dolomite wherein a concentration gradient is maintained in the vertical direction. Countercurrent contacting between upwardly directed sulfur containing combustion gases and descending sorbent particulate material creates a concentration gradient across the vertical extent of the bed characterized in progressively decreasing concentration of sulfur, sulfur dioxide and like contaminants upwardly and decreasing concentration of e.g. calcium oxide, downwardly. In this manner, gases having progressively decreasing sulfur contents contact correspondingly atmospheres having progressively increasing concentrations of calcium oxide thus assuring optimum sulfur removal.

7 Claims, 2 Drawing Figures

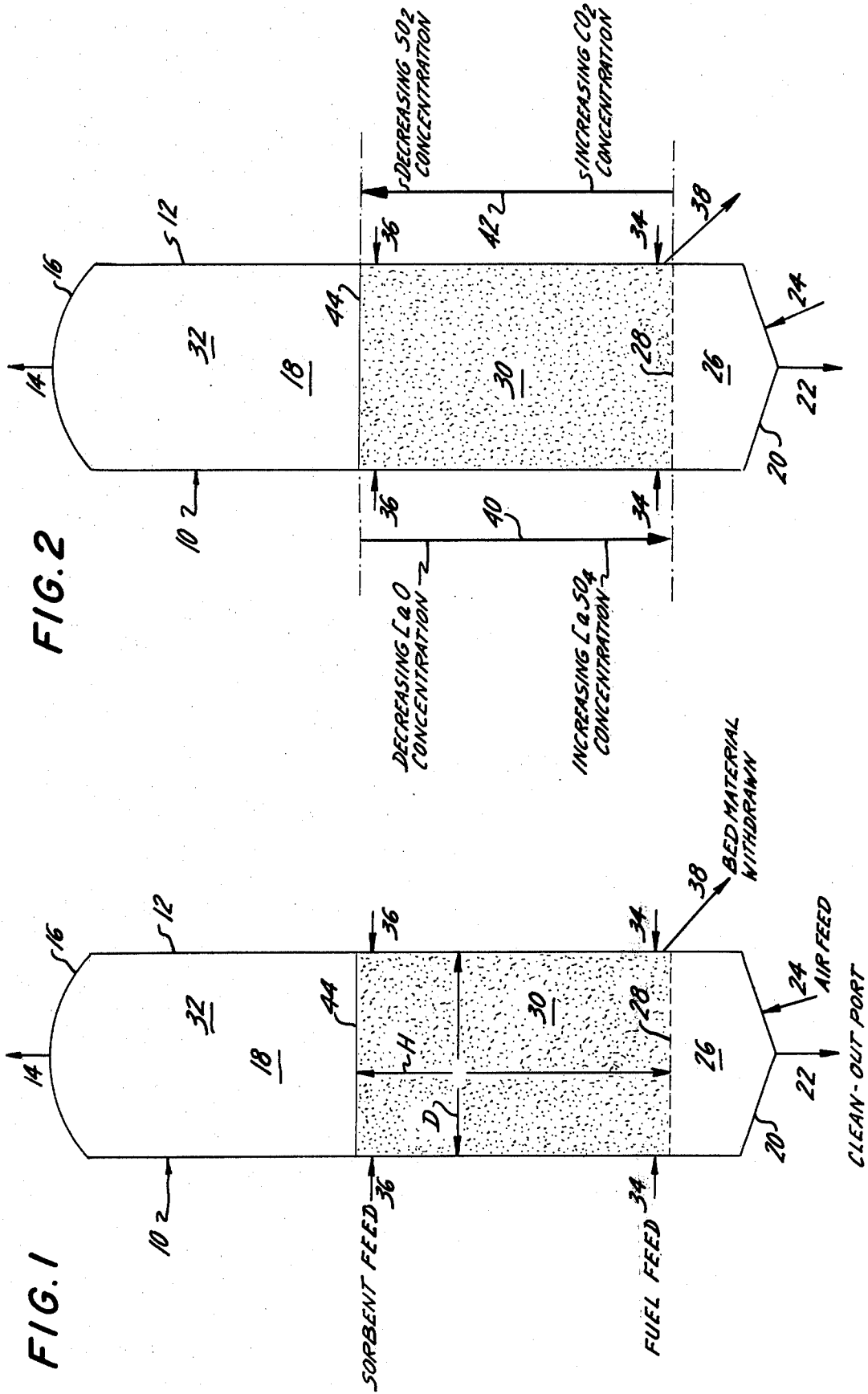

DECONTAMINATION OF COMBUSTION GASES IN FLUIDIZED BED INCINERATORS

The invention relates to the in-situ treatment of noxious, gaseous, combustion products produced within a fluidized bed combustion system to effectively remove sulfur-containing atmospheric pollutants (i.e. sulfur dioxide) therefrom.

Fluidized bed combustion systems are recognized as providing highly effective means for generating heat. As such, they are industrially applied to a variety of unit operations ranging from the generation of hot gases for the extraction of sensible heat therefrom to the incineration of combustible sewage sudge and oil refinery wastes. In the operation of such incineration systems, air is passed through a gas distribution or constriction plate to fluidize inert bed particles supported by such plate. After raising the bed temperature to a predetermined level, fuel is injected into the bed and ignited to raise the temperature to the operating range. Thereupon, the sewage, oil refinery waste stream or the like is introduced to the bed and undergoes combustion with the evolution of substantial quantities of heat. Heat generation may be sufficient to eliminate any further necessity for auxiliary fuel.

So called "clean" fuels as typified by natural gas and No. 2 fuel oil, are becoming increasingly more costly to the extent of becoming economically prohibitive. Cheaper fuel, as typified by high sulfur coal, high sulfur residual oil (Bunker C, No. 6, for example) containing generally about $\frac{1}{2}\%$ by weight or more of sulfur, are proposed alternatives. However, though feasible from both operational and economic standpoints, their use entails the possible risk of environmental pollution since $SO_2$ and similarly noxious sulfur containing materials resulting from the combustion of fuel or waste material would be emitted with the incinerator stack gases. Emission of such pollutants may, in fact, violate governmental regulations thereby invoking possible civil and/or criminal sanctions.

Generally, the removal of sulfur pollutants produced as described is attempted by the use of sorbents such as calcium carbonate (limestone), calcium oxide (lime) and dolomite either as the bed material as described in U.S. Pat. No. 3,982,901 or as a pre-added material introduced at some stage prior to incineration. In either case the sulfur material reacts with the sorbent material, for example limestone to form the salt, $CaSO_4$, and is removed as such from the incineration unit. In accordance with current technology, as exemplified by the foregoing patents, essentially homogeneous bed systems are achieved. Due to significant back mixing, the distribution of the limestone, lime and/or dolomite sorbent, as well as pollutant gases, is relatively uniform throughout the contact zone defined by the fluidized bed. In such systems, even though employing a countercurrent mode of contacting bed material and pollutant gases, discriminatory contacting between bed particles and pollutants can neither be predetermined nor controlled. Thus, substantially spent and thus ineffective limestone may contact a sulfur atmosphere at or near the freeboard side of the contact zone thereby resulting in the discharge of sulfur pollutant to the atmosphere through the incinerator stack. In addition, any possible in-situ calcination of limestone to CaO, the latter being generally recognized to be the more effective sulfur sorbent, most probably occurs undesirably in an $SO_2$-rich atmosphere. A separate precalcination unit is required unless the more expensive CaO is used in the first instance as the bed material. In any event, processing of the aforedescribed type, to be effective, requires the use of relatively large amounts of sorbent.

SUMMARY OF THE INVENTION

A primary object of the invention is to provide a process for the treatment of gaseous combustion products produced within a fluidized bed combustion system to remove sulfur-containing atmospheric pollutants therefrom wherein the aforedescribed problems are eliminated or at least mitigated to a substantial extent.

Another object of the invention is to provide such a process wherein the necessity for precalcination of limestone bed material is eliminated.

An additional object of the invention is to provide such a process wherein the necessity for using relatively large amounts of sorbent bed materials is eliminated.

Still another object of the invention is to provide such a process wherein contacting of spent, that is, fully reacted bed material with sulfur rich atmospheres at or near the freeboard boundary of the fluidized bed is minimized.

Other object and advantages will become more apparent hereinafter as the description proceeds.

The foregoing and related objects are obtained in accordance with the invention which in its broader aspects provide a process for effectively removing sulfur, sulfur dioxide and like atmospheric pollutants from a gaseous stream produced by the incineration of one or more combustible feed materials containing molecular and/or combined sulfur comprising, passing said stream upwardly through a high temperature contact zone defined by a fluidized bed of countercurrent, descending sorbent particulate material capable of combining at the high temperature with said pollutants to provide a solid adduct, the opposed points of entry of said sorbent refractory particulate and combustible particulate materials respectively being such that each traverses at least about 90% of the vertical extent of said contact zone and wherein back-mixing is minimized by maintaining a sufficiently large height-diameter ratio of said contact zone, i.e. greater than about 5:1.

Other objects and advantages will become apparent from the following description taken in conjunction with the accompanying drawings in which:

BRIEF DESCRIPTION OF THE DRAWINGS

FIG. 1 is a schematic illustration of an embodiment of the invention, and

FIG. 2 is a schematic illustration indicating generally a concentration gradient obtained in accordance with an embodiment of the invention.

DETAILED DESCRIPTION OF THE INVENTION

With continuing reference to the accompanying drawings, wherein like reference numerals designate similar parts throughout the illustrations, reference numeral 10 generally designates a fluidized bed combustion unit in which the process of the invention can be carried out. In general, combustion unit 10 comprises an outer shell 12 having an exhaust gas outlet 14 provided in a roof portion 16 which outlet communicates with a reactive chamber 18 of combustion unit 10. In general, outer shell 12 is of steel construction and is provided, internally, with a refractory lining (not shown). A conical wall 20 forms the bottom of combustion unit 10 and is provided with a clean out port 22. An air inlet 24, such as a blower unit, supplied fluidizing gas to a windbox 26 preferably through headers (not shown). A horizontal constriction or perforate plate 28, which may be provided with tuyeres (not shown) as is known in the art, horizontally divides combustion unit 10 into the reaction chamber portion 18 and a windbox portion 26. Constriction plate 28 is capable of supporting a fluidized bed 30, the latter defining a sorbent gas contact zone. As illustrated, reaction chamber 18 comprises the fluidized bed contact zone 30 and a freeboard zone 32. One or a plurality of fuel feeds 34 and sorbent feeds 36 are disposed about the periphery of combustion unit 10 (usually of generally cylindrical shape) and communicate directly with reaction chamber 18. Fuel feed(s) 34 may be adapted to deliver solid, liquid and/or gas material as well as any additional air which may be necessary to support combustion. An underflow 38 enables withdrawal of solid materials from reaction chamber 18. Apparatus useful herein of the type described is well known in the art and in this regard reference is made to the fluidized bed incinerator described in, for example, U.S. Pat. No. 4,168,670, the relevant portions of which are incorporated herein by reference. As will be made clear hereinafter, the described apparatus may be further modified in accordance with prior art teachings to enhance particular aspects and obtain specific advantages.

It is essential that the fluidized bed 30 not be fully back-mixed by maintaining a height diameter ratio in excess of about 5:1. These parameters, height and diameter, are indicated by designations H & D, respectively in FIG. 1. The utilization of diameter is appropriate since the combustion unit 10 will generally be approximately cylindrical in shape. In accordance with the invention, it is found that vertical back mixing of the upwardly-flowing pollutant gases and descending sorbent particles is minimized when maintaining a fluidized bed within the stated height-diameter ratio. "Back-mixing" as used herein refers essentially to the tendency of the sorbent particles to undergo haphazard flow. The consequent "teetering" effect results in a random, relatively disoriented, distribution of the particles throughout the contact zone 30 with the establishment of secondary flowpaths often directly opposed to the primary flow direction. In effect then, many of the particles "back-up". This phenomenon is undesired since there is no assurance that sulfur-poor atmospheres in the proximity of a freeboard boundary 44 of fluidized bed 30 will necessarily contact fresh sorbent material, the latter being the ideal situation.

In the present invention, back-mixing is minimized since the countercurrent streams undergo essentially laminar flow. In this manner and as illustrated in FIG. 2, relatively uniform concentration gradients are established across the fluidized bed 30 having a direction coincident with the vertical axis of combustion unit 10. As indicated by a directional arrow 42, $SO_2$ concentration decreases while $CO_2$ concentration increases as the pollutant gas stream proceeds upwardly through the fluidized bed 30. On the other hand, the CaO concentration decreases while $CaSO_4$ concentration increases in the downward direction through the fluidized bed 30 as indicated by a directional arrow 40. Accordingly, progressively decreasing sulfur atmospheres encounter progressively increasing CaO concentration regions assuring contact between sorbent bed particles having maximum sorbency and gaseous atmospheres having reduced sulfur concentrations at or near the freeboard boundary 44 of fluidized bed 30.

The temperature maintained across fluidized bed 30 may vary within ranges customarily used in such incineration processes as is well known. The temperature selected should enable substantial calcination of limestone occurring under the conditions described. As is evident from FIG. 2, in-situ calcination of limestone is desirably achieved in the relatively sulfur-poor atmosphere extant in the region of freeboard boundary 44. This is highly conducive to rapid and efficient calcination. In effect, the calcination conditions are in all essential aspects similar to those which would prevail, were a separate calcination unit used. The present invention thus obviates any necessity for a separate pre-calcination unit. This is an important advantage over prior art techniques wherein it is often necessary to use calcined limestone as the feed material to the combustion unit. Moreover, relatively less particulate sorbent material is needed herein since, as previously described, the "freshest" sorbent is available where the sulfur, sulfur dioxide, etc. concentration levels are at their lowest within fluidized bed 30.

The fuel and sorbent materials are fed to combustion unit 10 at or near the respective lower and upper boundaries of fluidized bed 30. The points of entry are selected to insure that the sorbent feed material and consequent combustion bases traverse at least about 90% of the height H of fluidized bed 30 to insure effective results. Reduction of the H:D ratio below the minimum value stated materially increases the likelihood of back-mixing and disruption of the aforementioned concentration gradients. Compliance with the hereinbefore stated parameters is thus essential in order to maximize operational efficacy.

The sorbent bed materials suitable for use herein are refractory particulate substances, well known in the art and include, e.g. limestone and/or dolomite. The particle size and bulk density of these materials as commercially supplied are standard in the art for fluidized bed use. Generally, the particle size of the sorbent material is such that preferred particles have a diameter of less than about $\frac{1}{8}$ inch.

In accordance with the instant process, air is admitted at inlet 24 to windbox 26 at a temperature of generally up to 650° F. at a velocity sufficient to fluidize the sorbent particles. The fluidized bed 30 is preferably composed of linestome or dolomite as described. Crushed coal containing sulfur is injected into fluidized bed 30 through fuel feeds 34. The coal is ignited in the fluidized bed 30 which reaches a controlled temperature of aboud 1600° F. generating a stream of gaseous sulfur oxidation products such as $SO_2$. These products proceed upwardly as indicated by directional arrow 42 in FIG. 2. Particulate sorbent is fed, preferably continuously, through sorbent feeds 36 to replenish that withdrawn from the underflow 38 primarily as $CaSO_4$. Formation of the latter occurs as follows. At the high bed temperature, the limestone, or more accurately, CaO, having a high surface area due to its relatively fine state of subdivision and pore structure, readily reacts with the sulfur pollutants to form $CaSO_4$ according to the following equation:

$$CaO + SO_2 + 0.5O_2 \rightarrow CaSO_4$$

It is generally advisable to provide an excess of CaO over the theoretical CaO requirement for neutralization of the sulfur-containing pollutants. The product calcium sulfate after removal from combustion unit 10 may be reheated by suitable means (not shown) to drive off $SO_3$ as the initial step in the production of sulfuric acid and the resultant CaO reclaimed for recycle to fluidized bed 30. The combustion gases from which the sulfur containing pollutants have been substantially, that is effectively removed, are discharged to the atmosphere through exhaust gas outlet 14 in essentially non-polluting form. Generally, the sulfur content of gases discharged to the atmosphere is substantially less, in terms of volume per cubic foot of discharged gas, than the minimum limits imposed by environmental regulations.

In operation, it is observed that a substantial portion of the feed limestone is effectively calcined during the initial phase of its descent through the contact zone 30, that is after traversing but a relatively minor portion of its vertical path. This occurs inherently under the operating conditions prescribed herein.

The aforedescribed embodiment can be used to burn high sulfur coal as a fuel to generate hot gases capable, for example, of driving a gas turbine which, in turn, drives a generator which produces electric power. Effective reduction of sulfur gases is important here also since such gases are highly corrosive to turbine blades.

In yet another application of the invention, combustible sludge and oil refinery wastes can be effectively incinerated. These can be added to combustion unit 10 along with the fuel feed or separately introduced as desired. In many instances, refuse to be incinerated likewise contains appreciable quantities of sulfur. The instant process is particularly effective with respect thereto.

Thus, the present invention enables the feasible use of high sulfur fuels in a wide variety of operations capable of implementation utilizing a fluidized bed combustion unit. By virtue of the instant process, savings are attributable not only to the use of less costly fuel but additionally to such other aspects as enhanced efficiency of sorbent use and inherent calcination as discussed.

The process can be effectively carried out with apparatus incorporating, for example, the heat exchange means described in U.S. Pat. No. 3,982,901. Generally, a given apparatus is suitable provided it be equipped as generally described herein. The particular type of means used for delivering fuel, be it liquid or solid, particulate sorbent, refuse and the like, to the combustion unit as well as for withdrawing gaseous and solid combustion and other products, are largely optional and in any event are described in detail in the relevant prior art.

Furthermore, although the present invention has been described with particular reference to preferred embodiments, it will be apparent to those skilled in the art that variations and modifications may occur to one skilled in the art without departing from the scope of the invention.

I claim:

1. A process for effectively removing sulfur and sulfur oxide atmospheric pollutants from a gaseous stream produced by the incineration of one or more combustible feed materials containing either molecular or combined sulfur or both comprising, passing said stream upwardly through a high temperature contact zone defined by a fluidized bed of countercurrent, descending sorbent particulate material capable of combining at the high temperature with said pollutants to provide a solid adduct, the opposed points of entry of said sorbent particulate and combustible feed materials respectively being such that said sorbent and combustion products of said combustible feed materials traverse at least about 90% of the vertical extent of said contact zone and wherein concentration gradients are maintained vertically.

2. A process according to claim 1 wherein the temperature of said contact zone during incineration is about 1600° F.

3. A process according to claim 1 wherein the bulk density of said sorbent particular material has a diameter of less than about ⅛ inch.

4. A process according to claim 1 wherein said sorbent particulate material is limestone.

5. A process according to claim 1 wherein said combustible feed material is bituminous coal.

6. A process according to claim 4 wherein substantial calcination of said limestone occurs in the upper portion of said contact zone in an atmosphere having a low concentration of contaminant sulfur material.

7. A process according to claim 1 wherein said sorbent particulate material is dolomite.

* * * * *